United States Patent [19]

Willoughby

[11] 3,827,037
[45] July 30, 1974

[54] WIND DIRECTION MONITOR SCALE CONVERTER

[75] Inventor: Anthony Roy Willoughby, Baltimore, Md.

[73] Assignee: The Bendix Corporation, Southfield, Mich.

[22] Filed: Mar. 20, 1973

[21] Appl. No.: 343,060

[52] U.S. Cl.............. 340/177 R, 340/178, 340/206
[51] Int. Cl........................................... G08c 19/04
[58] Field of Search......... 340/177 R, 178, 179, 206

[56] References Cited
UNITED STATES PATENTS
3,678,485   7/1972   Jones............................ 340/177 R

*Primary Examiner*—Thomas B. Habecker
*Attorney, Agent, or Firm*—W. G. Christoforo; Bruce L. Lamb

[57] ABSTRACT

A wind vane drives a movable contact of a voltage divider comprised of a 360° potentiometer. The movable contact is connected into an electrical summing point in an electrical circuit which responds to a discontinuity in the potentiometer output to add or subtract a sufficient electrical quantity at the summing point to compensate for the discontinuity. In addition, at the end of the electrical range of the circuit an electrical quantity equivalent to a predetermined amount of vane rotation is added or subtracted from the summing point as required to reposition the electrical sum to a valve intermediate of its range.

11 Claims, 2 Drawing Figures

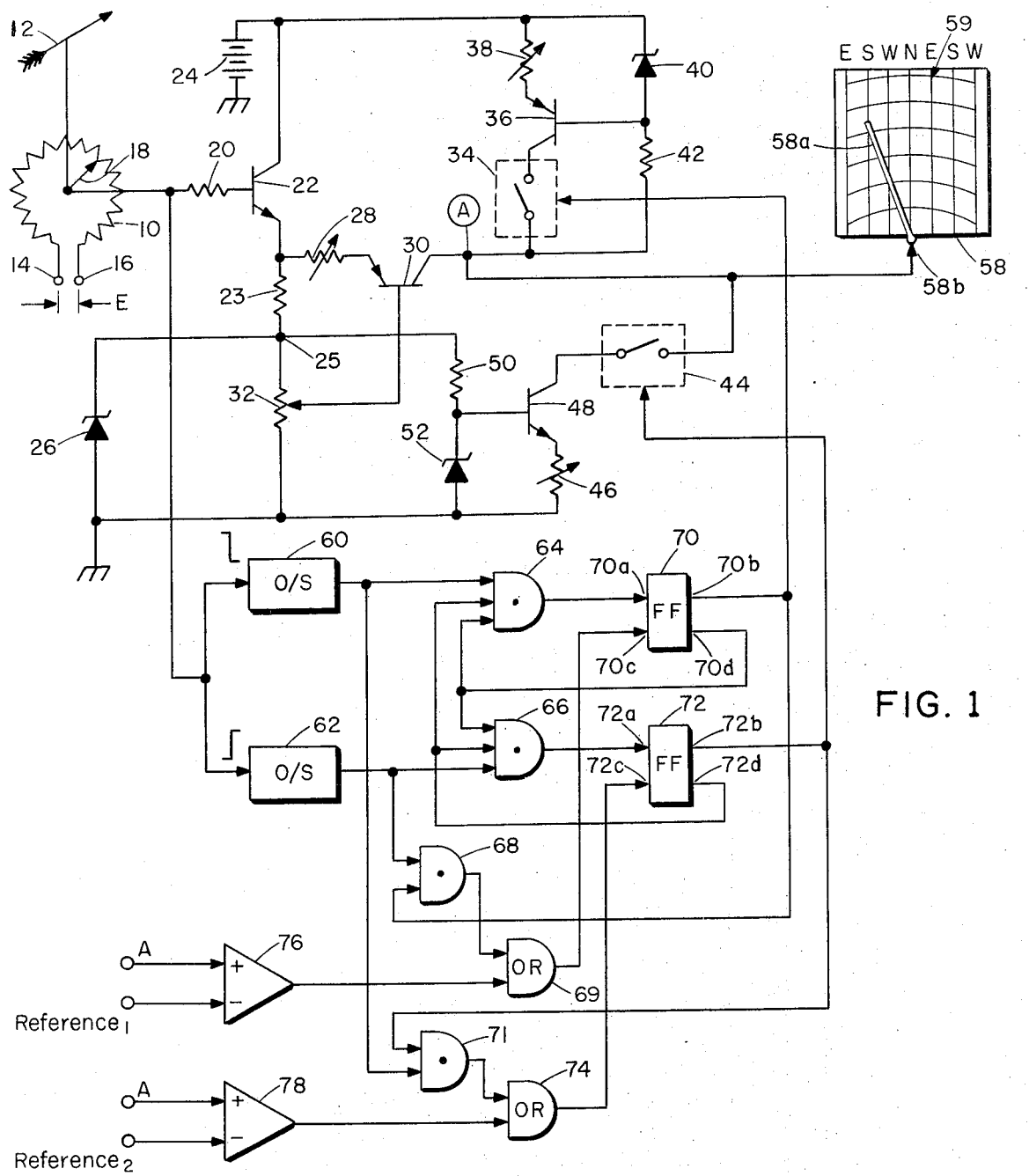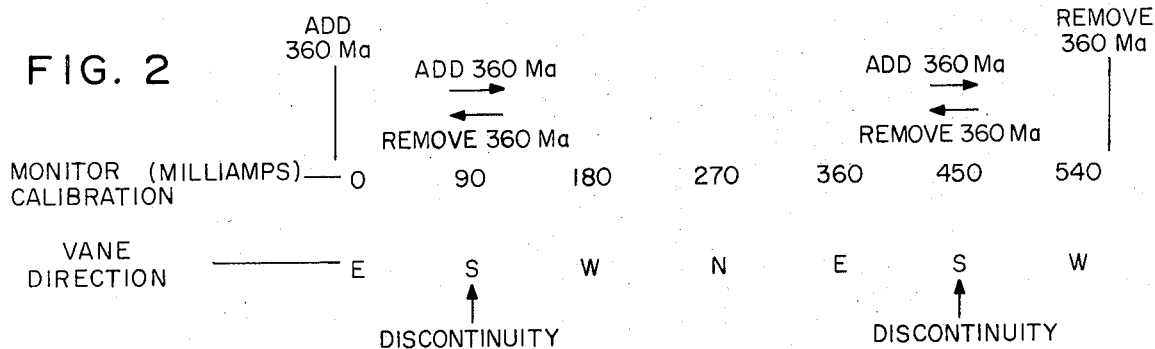

WIND DIRECTION MONITOR SCALE CONVERTER

BACKGROUND OF THE INVENTION

This invention relates to means for monitoring the rotational position of a shaft and more particularly relates to such a system where the shaft drives a rotary electrical output device having a range form 0° to 360° and having a discontinuity at the 0, 360° point. The invention generally eliminates the problems associated with the aforementioned discontinuity when recording the shaft position on a strip chart.

The present invention has particular use in wind direction recording apparatus of the type employing an electrical means having a 0°–360° range for generating an output signal correlated to wind vane position such as a linear single turn potentiometer having a movable tap or slider drivenly connected to the wind vane and where additionally the output signal, for example, the movable tap is electrically connected to position a stylus on a moving tape in accordance with the angular position of the wind vane. When wind direction data is sensed by such an electrical means, problems are encountered in trying to display the information on an analog meter. One end of the meter scale normally represents 0° while the other end represents 360°. Now, as the wind direction fluctuates about 0° the meter continually switches from one end of the scale to the other and back again. If the meter comprises a strip chart recorder, the stylus thereof will move back and forth across the paper generally obscuring the record.

This problem has been solved in the past by calibrating the strip chart with standard calibration lines for a wind direction of 000° through 360° and with additional calibration lines through a successive 180°. When the stylus now reached the limits of its range, it was displaced 360° back towards the center of the chart. In this manner, the stylus continued to indicate the actual direction of the wind vane more centrally of its total range.

One means for effecting this repositioning of the stylus has been, in the prior art, two, single turn 360° potentiometers driven in common by a wind vane and having the discontinuities displaced by 180°. Switching circuitry responding to the angular position of the wind vane selected the proper potentiometer to drive a direction indicator.

Other prior art means for effecting repositioning of the stylus have involved means for shifting the electrical potential impressed across a potentiometer.

SUMMARY OF THE INVENTION

The present invention is a scale converter which makes use of a single potentiometer or equivalent device and associated switching circuitry to reposition the stylus on a wind direction indicator or monitor by 360° when the limits of the range of the monitor are reached. The range of the monitor has been expanded in accordance with the prior art. In the embodiments shown the movable contact or tap of a voltage divider comprised of a 360° linear single turn potentiometer is ganged to a wind vane. This type of potentiometer has a discontinuity at the cross-over point normally correlated as between 0° and 360°. The movable contact is connected to an electrical summing point in an electrical circuit. The electrical circuit responds when the movable contact moves across the discontinuity to add or subtract a sufficient electrical quantity produced by the discontinuity. The electrical quantity may be either in volts or current, depending upon the design of the electrical circuit and the meter movement to be used. In addition, at the end of the electrical range of the circuit an electrical quantity equivalent to a predetermined amount of vane rotation, suitably 360° rotation, is added or subtracted from the summing point as required to reposition the electrical sum to a value interior of the monitor range and displaced 360° from the end of the range.

It is thus an object of this invention to provide a scale converter for use in a wind direction monitor.

It is another object of this invention to provide a scale converter for use with a wind direction monitor for repositioning a monitor stylus when the monitor reaches the limits of its range.

A further object of the invention is to provide a scale converter of the type described which uses a single potentiometer to perform its objective.

BRIEF DESCRIPTION OF THE DRAWINGS

FIG. 1 is a schematic showing one particular embodiment of the invention.

FIG. 2 is a diagram which illustrates in a simplified manner the operation of the invention as embodied in FIG. 1.

DESCRIPTION OF THE PREFERRED EMBODIMENT

Refer first to FIG. 1 where a linear, single turn potentiometer 10 has a movable tap 18 drivenly connected to wind vane 12. Potentiometer 10 includes a winding having terminals 14 and 16 across which a constant d.c. voltage E is impressed so that the voltage at tap 18 is correlated to the angular position of vane 12. Although a potentiometer is shown it should be understood that any electrical device having an electrical output correlated to vane position cyclically indicating 0°–360° of vane position and having a discontinuity can be used with the invention. Movable tap 18 is electrically connected through resistor 20 to the base electrode of NPN transistor 22. The collector electrode of transistor 22 is connected to the positive terminal of a d.c. voltage source 24 whose other terminal is grounded. The emitter electrode of transistor 22 is connected through resistor 23 to a point 25 which is maintained at a constant voltage level by a Zener diode 26 connected between point 25 and ground. The emitter electrode of transistor 22 is also connected through adjustable resistor 28 to the emitter electrode of PNP transistor 30 whose base electrode is connected to the adjustable contact of adjustable resistor 32 which is connected between point 25 and ground. The collector electrode of transistor 30 is connected to a summing point A. Point A is connected through a switch 34 to the collector electrode of PNP transistor 36 whose emitter electrode is connected through adjustable resistor 38 to the positive terminal of d.c. voltage source 24. A Zener diode 40 and resistor 42 are serially connected between the same positive terminal and point A, with a common junction point being connected to the base electrode of transistor 36.

In like manner point A is connected through switch 44 to the collector electrode of NPN transistor 48 whose emitter electrode is connected to ground through adjustable resistor 46. A resistor 50 and Zener diode 52 are serially connected between point 25 and ground with the common junction point therebetween being connected to the base electrode of transistor 48. Point A is also connected into a wind direction monitor such as strip chart recorder 58 at input terminal 58b. The monitor includes circuitry whereby it responds to current flow past terminal 58b to position stylus 58a, suitably on chart 59 which has a range of 540°.

Tap 18 is also connected as an input to one-shots 60 and 62. One-shot 60 is triggered on a trailing edge and specifically when tap 18 moves across the discontinuity of potentiometer 10 from the high voltage terminal 16 to terminal 14 while one-shot 62 is triggered on a leading edge and specifically when tap 18 moves across the discontinuity of potentiometer 10 from terminal 14 to terminal 16. The output terminal of one-shot 60 is connected as an input to AND gate 64 whose output is connected to the set input terminal 70a of flip-flop 70. A signal at the set terminal causes an output at set output terminal 70b. The output from one-shot 62 is connected as an input to AND gate 68 and also as an input to AND gate 66 whose output is connected to the flip-flop 72 set terminal 72a. A signal at this input terminal causes a signal to appear at set output termina 72b. AND gate 68 receives a second input from the set output terminal 70b. The output terminal of one-shot 60 is also connected as an input to AND gate 71 which receives a second input from set output terminal 72b. The output from AND gate 68 is connected through OR gate 69 to the reset terminal 70c. A signal at terminal 70c causes flip-flop 70 to reset so that a signal is generated at terminal 70d which is applied as inputs to gates 64 and 66. In like manner, the output from gate 71 is applied through OR gate 74 to reset terminal 72c. A signal at terminal 72c causes flip-flop 72 to reset so that a signal is generated at terminal 72d which is applied to gates 64 and 66. OR gate 69 receives a second input from comparator 76 which compares the voltage at summing point A against a fire reference voltage from a source not indicated. OR gate 74 receives a second input from comparator 78 which compares the voltage at point A against a second reference voltage, not indicated. Of course, a signal applied at a set terminal will cause an existing signal at a reset output terminal to be extinguished while a signal applied at a reset terminal will cause an existing signal at a set output terminal to be extinguished. In summary, the operation of this portion of the circuit is such that if both flip-flops are reset so that both switches 34 and 44 are open, triggering of either one-shot 60 or 62 will cause its associated flip-flop 70 or 72, respectively, to be set so that the associated switch 34 or 44, respectively, is closed. If one flip-flop is set while the other is reset, triggering of the one-shot associated with the set flip-flop will cause that flip-flop to be reset.

It will be assumed in explaining the operation of the circuit of FIG. 1, that a voltage E of 10 volts is impressed across terminals 14 and 16 with terminal 16 being more positive. It is further assumed that tap 18 is at the potentiometer discontinuity when the direction of the wind is south. With tap 18 at terminal 14, resistor 28 is adjusted so that voltage thereacross is equal to 2.5 volts which is equivalent to a 90° rotation of wind vane 12. Resistor 32 is adjusted so that the current to point A from the collector of transistor 30 is equal to 90 milliamps, also equivalent to a 90° rotation of wind vane 12. It is also assumed that switches 34 and 44 are open and that monitor 58 is chosen to be 540 milliamps full scale. It will thus resigter 90° from the left hand end or south. As tap 18 swings clockwise through 360° to voltage across resistor 28 will increase linearly thus increasing the current flowing into point A of transistor 30 linearly. When wiper 18 reaches terminal 16, that is the other south position, there will be 450 milliamps flowing into point A from transistor 30. If wiper 18 continues to rotate clockwise the voltage on the wiper will suddenly decrease by 10 volts thereby reducing the current into point A from transistor 30 by 360 milliamps. However, the sudden drop in voltage is detected by one-shot 60 whose output pulses passes through the qualified AND gate 64 to terminal 70a thus causing flip-flop 70 to be set so that an output appears at terminal 70b which is applied to close switch 34.

The transistor 36, which it can be seen is connected as a constant current source, has been previously preset by adjustment of resistor 38 to supply 360 milliamps of current at its collector electrode. Accordingly, when switch 34 closes the 360 milliamps of current which are lost at point A when tap 18 moves across the potentiometer discontinuity from terminal 16 to terminal 14 is supplied from transistor 36 so that the current into monitor 58 remains the same at 450 milliamps, which, of course, is also flowing past terminal 58b. If wiper 18 continues to rotate in a clockwise direction the current into A from transistor 30 will continue to increase until it reaches 540 milliamps. This is equivalent to a predetermined potential level at point A, which level is detected by comparator 76 which thereupon generates an output which is applied through OR gate 69 to reset flip-flop 70, thus extinguishing the signal at terminal 70b thereby causing switch 34 to open. This action causes 360 milliamps to be removed from point A so that the stylus 58a of monitor 58 drops back 360°. This is a movement of stylus 58a from the extreme west position on the monitor to the west position more centrally located. It will also be noted that the circuit of FIG. 1 is now at its assumed initial condition, that is, where switches 34 and 44 are opened. Also note that at this time 180 milliamps are being supplied to monitor 58.

Assume now that vane 12 begins to rotate counterclockwise. When tap 18 contacts terminal 14, vane 12 is indicating the south position and 90 milliamps are supplied to monitor 58. As this counterclockwise motion continues tap 18 will move across the discontinuity of potentiometer 10 from terminal 14 and terminal 16. This sudden increase in voltage at tap 18 causes the voltage across resistor 28 to increase by 10 volts thus causing an increase into point A of 360 milliamps of current from the collector electrode of transistor 30. However, at the same time, the sudden increase in voltage causes one-shot 62 to be triggered and its output pulse applied through qualified gate 66 to terminal 72a thereby setting flip-flop 72 to energize terminal 72b thereby closing switch 44. Transistor 48, which is connected as a constant current source, has been previously adjusted by manipulation of resistor 46 to receive 360 milliamps at its collector electrode. Accordingly, when switch 44 closes the extra 360 milliamps of current supplied by transistor 30 are drawn off by transistor 48 so that the current into monitor 58 remains the same at 90 milliamps. If tap 18 continues to rotate counterclockwise the current from point A from transistor 30 continues to decrease until the tap moves an additional 90°, indicating that the wind is from the east, at which time the current into point A from transistor 30 is 360 milliamps. However, since switch 44 is closed this 360 milliamps is being drawn off so that no current reaches monitor 58. This condition is sensed by comparator 78 which thus generates an output signal which is applied through OR gate 74 to reset flip-flop 72 thus opening switch 44. The 360 milliamps into point A is thus no longer drawn off through this switch but is applied to monitor 58 so that the stylus 58a moves 360° to the right to the second and more centrally located east position. This circuit is again at its initial condition, that is, the switches 34 and 44 open.

FIG. 2, reference to which should now be made, more particularly describes the operation of the circuit of FIG. 1. In that circuit it will be remembered that potentiometer discontinuities were oriented to occur when the movable tap indicated the south position and the monitor was calibrated in milliamps from 0 to 540 milliamps across a range of 0° to 540° starting with the east on the left side of the monitor scale to the west on the right side of the scale. Moving to the right across the monitor chart of FIG. 1 corresponds to clockwise rotation of movable tap 18 of FIG. 1. It will be noted that as the movable tap moves through the discontinuity in a clockwise direction the voltage at the tap suddenly drops while if the tap moves through the discontinuity in a counterclockwise direction the voltage at the tap suddenly increases. The current contribution as the tap moves through the discontinuities is to increase the current when the voltage increases and to decrease the current when the voltage decreases. Thus, referring again to FIG. 2, as the tap moves through either one of the discontinuities in a clockwise direction the circuit operates to add 360 milliamps to the summing point to compensate for the 360 milliamps lost when the voltage at the movable tap suddenly drops. In addition, if the tap moves counterclockwise through the discontinuity, the circuit operates to remove 360 milliamps from the summing point to compensate for the sudden rise in voltage at the tap. More particularly and referring also and again to FIG. 1, when the tap moves through the discontinuity while the discontinuity corresponds to the monitor south position at 450 milliamps in a clockwise direction, the circuit acts to add 360 milliamps to the summing point by closing switch 34. When the tap moves through the discontinuity in a counterclockwise direction while the discontinuity corresponds to the same monitor south position, the circuit acts to remove 360 milliamps by opening switch 34. When the tap moves through the discontinuity in a counterclockwise direction when the discontinuity corresponds to the monitor south position at 90 milliamps the circuit acts to remove 360 milliamps from the summing point by closing switch 44 while movement of the tap through the discontinuity while corresponding to the latter south position causes the circuit to open switch 44 to restore the 360 milliamps to the summing point which had been removed when switch 44 was closed, thus in effect adding 360 milliamps to the summing point. In addition, at the right end point the circuit operates to remove 360 milliamps from the summing point to thus move the stylus of the monitor 360° to the left towards a more centrally located west position. In like manner, when the left end point is reached the circuit operates to add 360 milliamps to the summing point to thus move the stylus 360° to the right or towards a more centrally located east position.

Having shown this embodiment of the invention, other alterations and modifications should become obvious to one skilled in the art. Accordingly, the invention is to be limited only by the true scope and spirit of the appended claims.

The invention claimed is:

1. Means for use with a shaft rotary position monitor wherein said monitor is calibrated to indicate continuously the rotary position of said shaft from a first limit to a second limit over a range greater than 360° rotation of said shaft, comprising:

means for generating a first signal having an electrical value cyclically proportional to the rotary position of said shaft, said electrical value having a discontinuity indicative of a predetermined rotary position of said shaft and wherein said discontinuity is of a first sense when said shaft moves through said discontinuity in a first direction and of a second sense when said shaft moves through said discontinuity in a second direction;

means for generating a second signal indicative of a fixed predetermined amount of rotation of said shaft;

means for summing said first signal with said second signal to produce a third signal, said monitor being responsive to said third signal for indicating the rotary position of said shaft; and, means responsive to said shaft moving through said discontinuity when said monitor indicates a shaft position intermediate said first and second limits in said first direction for applying said second signal to said means for summing in a third sense whereby said second signal is subtracted from said third signal and responsive to said shaft moving through said discontinuity when said monitor indicates a shaft position intermediate said first and second limits in said second direction for applying said second signal to said means for summing in a fourth sense whereby said second signal is added to said third signal, and additionally responsive to said monitor reaching at least its second limit for applying said second signal to said means for summing in one of its first and second senses whereby said monitor subsequently indicates a shaft position intermediate said first and second limits.

2. The means of claim 1 wherein said means for generating comprises a single turn 360° linear potentiometer having a constant d.c. voltage impressed across said single turn and having a movable tap ganged to said shaft, said first signal being available at said movable tap.

3. The means of claim 1 wherein said means for generating comprises:

a single turn 360° linear potentiometer having a movable tap ganged to said shaft;

means for generating a d.c. voltage, said d.c. voltage being impressed across said potentiometer, a voltage level proportional to said shaft rotary position being thus available at said movable tap; and, means for generating a current proportional to said voltage level, said current comprising said first signal.

4. Means for use with a shaft rotary position monitor wherein said monitor is calibrated over a range greater than 360° from a first limit to a second limit to indicate continuously the rotary position of said shaft comprising:

means for generating a current which is linearly proportional to the rotary position of said shaft, said means having a discontinuity which corresponds to at least first and second indications of said monitor;

means for summing said current with second and third signals applied thereto, said second signal comprising a first fixed current directed into said means for summing and said third signal comprising a second fixed current directed away from said means for summing, said monitor being responsive to the sum for indicating the rotary position of said shaft;

means responsive to said shaft moving through the discontinuity when corresponding to said first indication and in a first direction for applying said second signal to said means for summing and responsive to said shaft moving through said discontinuity when corresponding to said first indication and in an opposite direction from said first direction for removing said second signal from said means for summing, and responsive to said shaft moving through the discontinuity when corresponding to said second indication and in said opposite direction for applying said third signal to said means for summing and responsive to said shaft moving through said discontinuity when corresponding to said second indication and in said first direction for removing said third signal from said means for summing, and being additionally responsive to said monitor reaching its second limit for removing from said means for summing a second signal previously applied thereto and responsive to said monitor reaching its first limit for removing from said means for summing a third signal previously applied thereto.

5. Means as recited in claim 4 wherein said means for generating comprises:

a source of constant d.c. voltage;

a 360° single turn linear potentiometer having said constant d.c. voltage impressed thereacross and a movable tap whose rotary position is correlated to the rotary position of said shaft, a voltage level linearly proportional to the rotary position of said shaft thereby appearing at said movable tap; and, means responsive to said voltage level for generating said current linearly proportional to said voltage level.

6. The means of claim 5 wherein the voltage level at said movable tap changes at a linear rate from a first level to a second level as said movable tap moves through 360° of said potentiometer in said first direction, said voltage level changing suddenly from said second level to said first level as said movable tap moves through said discontinuity in said first direction and wherein the voltage level on said movable tap changes at a linear rate from said second level to said first level as said movable tap moves through 360° of said potentiometer in said opposite direction, said voltage level changing suddenly from said first level to said second level as said movable tap moves through said discontinuity in said opposite direction, said means for applying being responsive to the sudden changes of voltage level from said second level to said first level when neither said second nor third signals are applied to said means for summing for applying said second signal to said means for summing and responsive to the sudden change in said voltage level from said first level to said second level when said second signal is applied to said means for summing for removing said second signal from said means for summing, and responsive to sudden changes of voltage level from said first level to said second level when neither said second nor third signals are applied to said means for summing for applying said third signal to said means for summing and responsive to sudden changes of voltage level from said second level when said third signal is applied to said means for summing for removing said third signal from said means for summing, said means for applying being additionally responsive to a first predetermined sum for removing a second signal previously applied from said means for summing and responsive to said sum attaining a second predetermined value for removing from said means for summing a third signal previously applied thereto.

7. The means of claim 6 wherein said discontinuity occurs cyclically at 360° positions of said movable tap, said discontinuity occurring at least twice in a movement of said movable tap for a range equal to the range of said monitor.

8. The means of claim 7 wherein the discontinuities occur at positions where said monitor indicates a shaft position intermediate said first and second limits.

9. The means of claim 7 wherein at least two of the discontinuities occur at positions where said monitor indicates a shaft position intermediate said first and second limits.

10. The means of claim 9 wherein said second and third signals comprise identical currents directed in an opposite sense from one another with respect to said means for summing.

11. The means of claim 10 wherein the current of said second and third signals is essentially equal to the current required to change the indication of said monitor by 360°.

* * * * *